May 5, 1953 R. B. COTTON 2,637,368
SHOCK ABSORBING MEANS FOR AIRCRAFT SEATS
Filed April 30, 1948

INVENTOR.
Robert B. Cotton.
BY
Herbert M. Birch
Attorney

Patented May 5, 1953

2,637,368

UNITED STATES PATENT OFFICE 2,637,368

SHOCK ABSORBING MEANS FOR AIRCRAFT SEATS

Robert B. Cotton, Lansdowne, Pa., assignor, by mesne assignments, to All American Engineering Company, Wilmington, Del., a corporation of Delaware Application April 30, 1948, Serial No. 24,269

4 Claims. (Cl. 155—9)

1

The present invention relates generally to shock absorbing means and particularly to means for use in combination with aircraft seats and safety harness therefor.

Heretofore there have been arrangements, such as yieldable safety belts and the like, made for absorbing a substantial component of load in a horizontal direction from excessive deceleration of an aircraft caused by a crash or forced landing on a rough terrain. With these prior art arrangements, there is no provision for absorbing a substantial component of load in a vertical direction with respect to the thrust line of an airplane, such as results during a large number of airplane crashes. Usually during a crash the plane engages the ground at an angle of thirty-five degrees or less. Kinetic energy in this vertical direction from the line of thrust of such landings is sometimes severe enough to break the pilot's back or injure his spine. Accordingly, an object of this invention is to provide novel means for absorbing a substantial amount of the vertical load with respect to an airplane's line of thrust caused by excessive deceleration during a crash to keep it within the bounds of human endurance or tolerable units of gravity.

At the present time, there is known and available to the public certain synthetic plastic fibers which in their undrawn state are susceptible of being drawn and while so drawing absorb energy. Moreover, this drawing is permanent and is not accompanied by any reaction, recoil, or rebound. Among such synthetic fibers might be noted undrawn nylon, polyethylene, Vinyon, and Vinylite. These are products made from synthetic linear condensation polyamide.

Accordingly, another object is to provide in combination with an aircraft seat adapted to slide on vertical guide means and a safety belt arrangement for yielding to absorb a component of load in a horizontal direction, a shock absorbing seat supporting means comprised of straps of undrawn synthetic plastic fibers or the like adapted to elongate and absorb a component of load in a vertical direction.

A further object is to provide a vertically guided aircraft seat suspended by straps of preloaded undrawn synthetic fibers, whereby said preloaded straps maintain the seat rigid until an excessive load is exerted on the seat.

With these and other objects in view, the present invention consists in the novel construction, arrangement and combination of parts described in the following specification and illustrated in the accompanying drawings.

2

In the drawings wherein like reference characters refer to like parts on the figures.

Figures 1, 2:
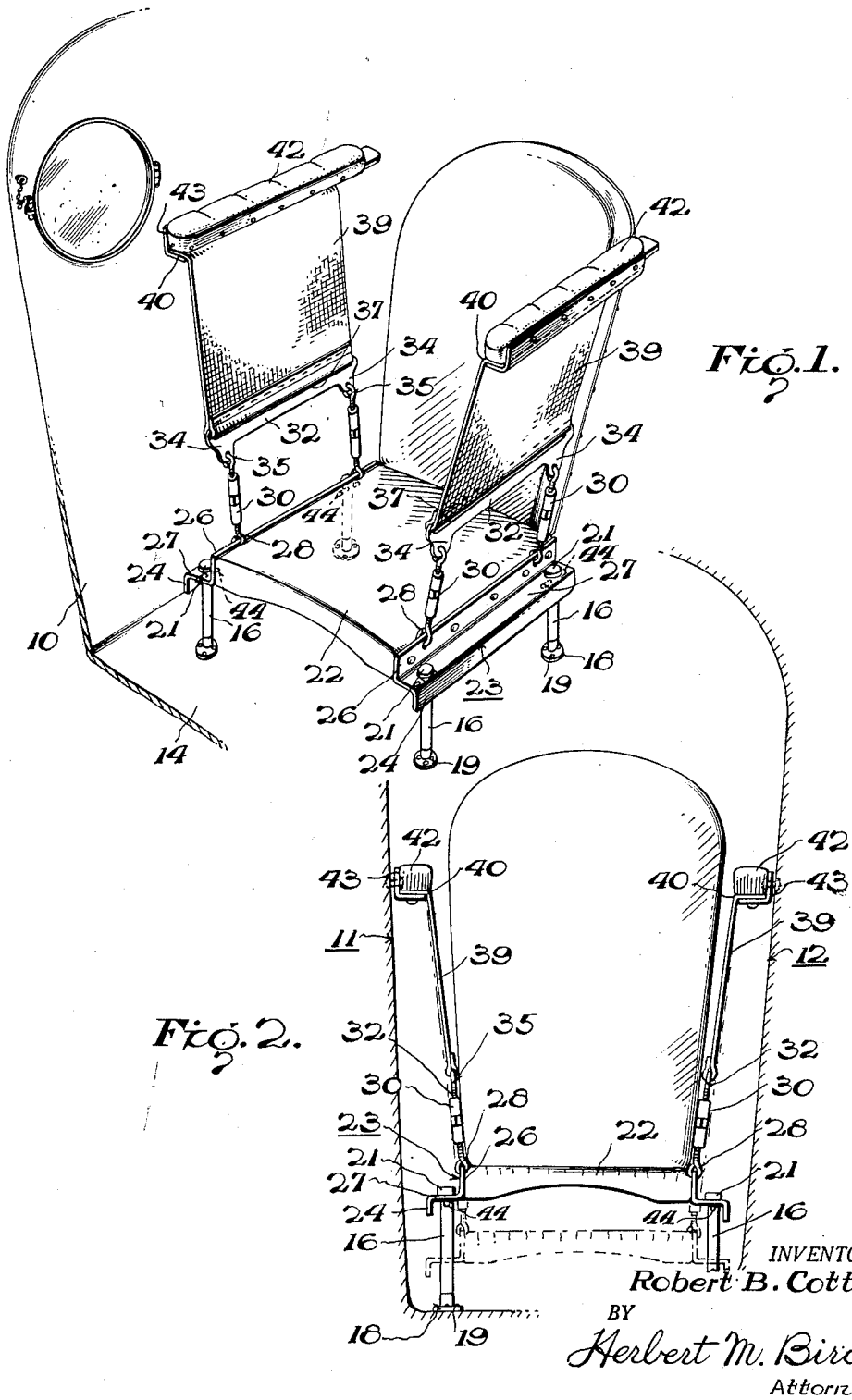
Figure 1 is a perspective view of an aircraft seat constructed according to the present invention showing the same mounted in the fuselage of an airplane.
Figure 2 is a front elevational view of the seat structure showing the position of the seat during an excessive load resulting from excessive deceleration.

Referring in detail to the drawings, numeral 10 generally indicates the body of an aircraft having side wall portions 11 and 12 and a floor 14. Extending vertically from the floor are guide members such as the rods 16. These rods 16 are formed with bases or feet 18 which are secured to the floor by means of rivets or screws 19. The upper end of each rod 16 is provided with a stop member 21, the purpose of which will hereinafter be explained.

Slidably mounted on the guide rod 16 is the seat portion of the present invention. This seat portion comprises the usual central seat cushion 22 with a rigid covered frame-work, not shown, and novel side frames 23 which are secured to covered frame-work at the sides of the seat cushion. These side frames 23 are of Z-shaped configuration to form vertical flanges 24 and 26 with a horizontal connecting leg 27. The leg 27 is formed with apertures to permit the side frame members 23 to engage over the guide rods 16, while the upper vertical flange 26 is secured to the sides of the seat portion. Also the flanges 26 are formed with spaced openings to receive the eye connections 28 of turnbuckles 30.

The turnbuckles 30 connect to elongated brackets 32. Each of the brackets 32 is formed with downwardly directed projections 34 formed with openings so as to receive the opposite eye connection 35 of the turnbuckles 30. The upper part of each bracket 32 contains an elongated slot 37 through which is looped a portion of the novel shock absorbing means, which are in the form of straps or webs of material 39.

Each of the webs 39 is pulled upward from their respective brackets 32 and anchored at their upper ends 40 between an arm rest 42 and angle-iron 43 which is secured to the side of the airplane body. After securing the ends 40 of the straps in this manner, the same are preloaded by adjusting the turnbuckles 30. This preloading is possible due to the particular type of material from which the straps 39 are made, such, for example, as undrawn synthetic plastic fibers. Among such materials are noted: undrawn nylon, polyethylene, Vinyon, and Vinylite. This type of material has the property of elongating under excessive loads and while so elongating it absorbs energy. In fact, this material can elongate permanently up to four-hundred percent depending upon the magnitude of the load applied and absorb a substantial amount of energy while so elongating.

During the preloading of each of the webs 39, as just described, the side frame members 23 are pulled upward along the guide rod 16 until the leg 27 abuts the stops 21 positioned at the top ends of the said guides. Thus, the seat is held rigid during normal use and under normal loads there will be no yielding of the seat in a vertical direction. However, when an excessive load is exerted upon the seat, due to excessive deceleration caused by a crash landing or the like, then the seat will vertically move downward over the guide members as the straps 39 elongate under the excessive load forces resulting.

Operation

The operation of the present invention is apparent from the foregoing description. However, the following briefly summarizes its action in use.

For example, the pilot as he sits in the seat will fasten the usual safety harness to the back of the seat as is well known in the art to provide for absorbing a substantial component of load in a horizontal direction. Also the turnbuckles 30 are preloaded to a load of approximately two thousand pounds so that the seat will be rigid, until a load developed from a crash or other cause is exerted on the seat in excess of the amount for which the seat straps have been adjusted. Now, when such a condition occurs causing an excessive load to be exerted on the seat, the non-elastic undrawn synthetic fibers in the straps will permanently elongate in accordance with the degree of load applied, and while so elongating they will absorb a substantial component of the energy in a vertical direction without recoil or rebound.

If desired the seat may normally be supported by light rigid frame structure independently of the preloaded shock absorber straps, such as by supporting pins 44 extending through the rods 16. These seat supporting pins and frame structure may be made of sufficient strength to withstand only the normal flying loads, so as to fail under impact decelerations, whereby the preloaded shock absorber straps then become effective to support the seat and act as shock absorbers when a load develops in excess of the amount for which the straps are set.

Thus, there is provided a novel shock absorbing means for use in connection with aircraft seats whereby in combination with means for absorbing a substantial component of load in a horizontal direction, said novel means cooperates to absorb a substantial component of load in a vertical direction without recoil or rebound.

While I have described and illustrated only one embodiment of the present invention, it is to be expressly understood that other arrangements of the present invention may be developed by those skilled in the art after they have studied the present invention. For a definition of the limits of the present invention, reference should be had to the appended claims.

What is claimed is:

1. An aircraft safety chair structure comprising fixed arm rests, webs of flexible non-resilient material permanently elongatable beyond their normal length when a crash occurs extending downwardly from the arm rests to form the sides of the chair, a seat portion connected to the depended ends of each of the said webs, crash frangible means normally supporting said seat above the floor of the aircraft, the weight of said seat and an occupant thereof being suspended solely by said webs following a crash, said seat supporting means including guide means substantially perpendicular with respect to the floor of the aircraft operatively associated with the seat portion for guiding the seat when said webs are elongated by forces in a substantially perpendicular direction from the line of thrust of the aircraft resulting from a crash and failure of said frangible seat support means.

2. The combination of a mobile craft and a chair located therein, said chair having spaced apart arm rests and being supported from the floor of the craft, said arm rests being fixed to respective sides of the craft, a seat portion and an elongatable flexible side connecting the seat portion to each arm rest permitting movement by elongation of the side only under loads exceeding the threshold of human endurance resulting from crash impacts, and guide means secured to the floor of the craft extending substantially perpendicular therefrom for guiding said seat in a substantially perpendicular direction during elongation of the sides with respect to the floor when a crash occurs, said elongatable sides serving as shock absorbers during elongation.

3. An aircraft chair having arm rests, said arm rests being fixed to respective sides of the aircraft, a seat portion, guide rods vertically supported on the floor of the aircraft and shock absorbing side members connected to each arm rest and each side of the chair seat, said side members comprising a strap of non-elastic permanently elongatable normally non-operating undrawn synthetic plastic fibers having the ability to elongate under loads in excess of the threshold of human endurance and while in elongation absorbing energy to a substantial degree, thereby reducing shock imparted from a crash impact to an occupant of the chair.

4. An aircraft safety chair structure comprising fixed arm rests, webs of flexible non-resilient material permanently elongatable beyond their normal length when a crash occurs extending downwardly from the arm rests to form the sides of the chair, a seat portion connected to the lower ends of the said webs, and seat supporting pins engaging with the seat and adapted to fail upon occurrence of a crash impact.

ROBERT B. COTTON.

References Cited in the file of this patent

UNITED STATES PATENTS

| Number | Name | Date |
|---|---|---|
| 235,819 | Smith | Dec. 21, 1880 |
| 1,720,485 | Leipert | July 9, 1929 |
| 1,774,555 | Horsley et al. | Sept. 2, 1930 |
| 1,979,892 | Loeffler | Nov. 6, 1934 |
| 2,440,574 | Cotton | Apr. 27, 1948 |
| 2,450,328 | Cotton | Sept. 28, 1948 |
| 2,459,545 | Schultz | Jan. 18, 1949 |
| 2,465,936 | Schultz | Mar. 29, 1949 |